United States Patent [19]

Lanser

[11] Patent Number: 4,720,662

[45] Date of Patent: Jan. 19, 1988

[54] MOTOR HAVING ALTERNATOR COILS

[76] Inventor: Leslie V. Lanser, 2032 Honey Run Rd., Chico, Calif. 95928

[21] Appl. No.: 908,196

[22] Filed: Sep. 17, 1986

Related U.S. Application Data

[63] Continuation-in-part of Ser. No. 876,433, Jun. 20, 1986, abandoned.

[51] Int. Cl.[4] ............................................. H02K 29/10
[52] U.S. Cl. ...................................... 318/138; 318/151; 318/254; 318/480; 310/113
[58] Field of Search ............... 318/138, 140, 141, 144, 318/148, 151, 152, 153, 254, 439, 480; 310/68 R, 113, 266

[56] References Cited

U.S. PATENT DOCUMENTS

| | | | |
|---|---|---|---|
| 2,279,690 | 4/1942 | Lindsey | 310/137 X |
| 2,511,412 | 6/1950 | Myrmirides | 310/113 |
| 2,538,119 | 1/1951 | Mironowicz | 310/113 X |
| 2,806,159 | 9/1957 | Sheldon | 310/113 |
| 3,484,635 | 12/1969 | Mackallor | 310/266 |
| 3,614,577 | 10/1971 | Honeywell | 310/266 X |
| 3,867,656 | 2/1975 | Mitsui et al. | 310/156 X |
| 3,906,267 | 9/1975 | Coupin et al. | 310/156 X |
| 3,931,531 | 1/1976 | Check et al. | 307/261 X |
| 3,937,974 | 2/1976 | Lafuze | 318/138 X |
| 3,953,751 | 4/1976 | Merkle et al. | 310/156 X |
| 4,055,789 | 10/1977 | Lasater | 318/138 X |
| 4,138,629 | 2/1979 | Miller et al. | 310/113 X |
| 4,228,384 | 10/1980 | Arnold et al. | 310/268 X |
| 4,459,501 | 7/1984 | Fawzy | 310/156 |

*Primary Examiner*—Bentsu Ro
*Attorney, Agent, or Firm*—Julian Caplan

[57] ABSTRACT

A motor has a stator having sequential groups of three coils designated 36, 37 and 38. On at least one side of the stator is a rotor having permanent magnets, alternating N and S. The source of power (herein a battery) is connected by switches to energize all of the coils 36 and 38, alternately. This causes the rotor to rotate. All of coils 37 and 38 and also all the coils 36 or 37 which are not energized by the battery, as the magnetic fields of the rotor pass by act as alternators and current produced thereby passes through a rectifier to charge the battery. The switches are controlled by means on the rotor such as windows cut in the rotor passing an optical sensor.

8 Claims, 6 Drawing Figures

MOTOR HAVING ALTERNATOR COILS

This application is a continuation-in-part of applicant's co-pending application, Ser. No. 876,433, filed on June 20, 1986, now abandoned.

FIELD OF THE INVENTION

This invention relates to a new and improved direct current electric motor characterized by the fact that the stator of the motor has sequential groups of three differently wound coils arranged around its perimeter, at least two groups of coils at all times serving as alternator coils to partially recharge the battery or other source of direct current.

DESCRIPTION OF RELATED ART

U.S. Pat. No. 2,279,690 shows a combination motor-generator. However, the present invention discloses like poles of permanent magnets facing each other. The direction of current in each coil is not reversed as in U.S. Pat. No. 2,279,690. Additionally, the axes of the coils are disposed in a different manner.

U.S. Pat. No. 3,931,531 relates generally to the subject matter of this case, but is considerably different in the method of operation of applicant's motor.

U.S. Pat. Nos. 2,806,159 and 4,459,501 disclose generator combinations.

Motor alternator devices are shown in such references as U.S. Pat. Nos. 3,867,656; 3,906,267; and 3,953,751 which show dual permanent magnet rotors flanked by fixed driver coils.

The use of photocell sensors, as shown in U.S. Pat. No. 4,228,384, but in a different environment.

SUMMARY OF THE INVENTION

The motor hereinafter described in detail utilizes two sequential series of coils on its stator which alternately function as driving and alternator coils and between each thereof is a third coil which functions solely as an alternator coil. Thus, as one of the coils is energized from the battery to drive the motor, the other two coils function as alternator coils and, through a rectifier, partially recharge the battery or other source of energy.

Features of the present invention are the facts that when in motor drive function each driving coil set always retains its own magnetic polarity; however, by means of electronic switches connecting the driving coil sets to a dc battery, when the two sets alternately are energized they, in effect, present an alternating magnetic polarity field to the dual permanent magnet rotors, and that there is no reversal of current in any of the driving coils when energized in driving function. Accordingly, the motor runs cool. In a preferred embodiment of the invention, there are no steel or iron cores for the coils and, hence, hysteresis and eddy currents are eliminated and the motor runs cool with no loss of power to heat. The invention discloses a motor which employs no brushes or commutator per se.

Other objects of the present invention will become apparent upon reading the following specification and referring to the accompanying drawing in which similar characters of reference represent corresponding parts in each of several views.

DESCRIPTION OF PREFERRED EMBODIMENTS

Figure 1:
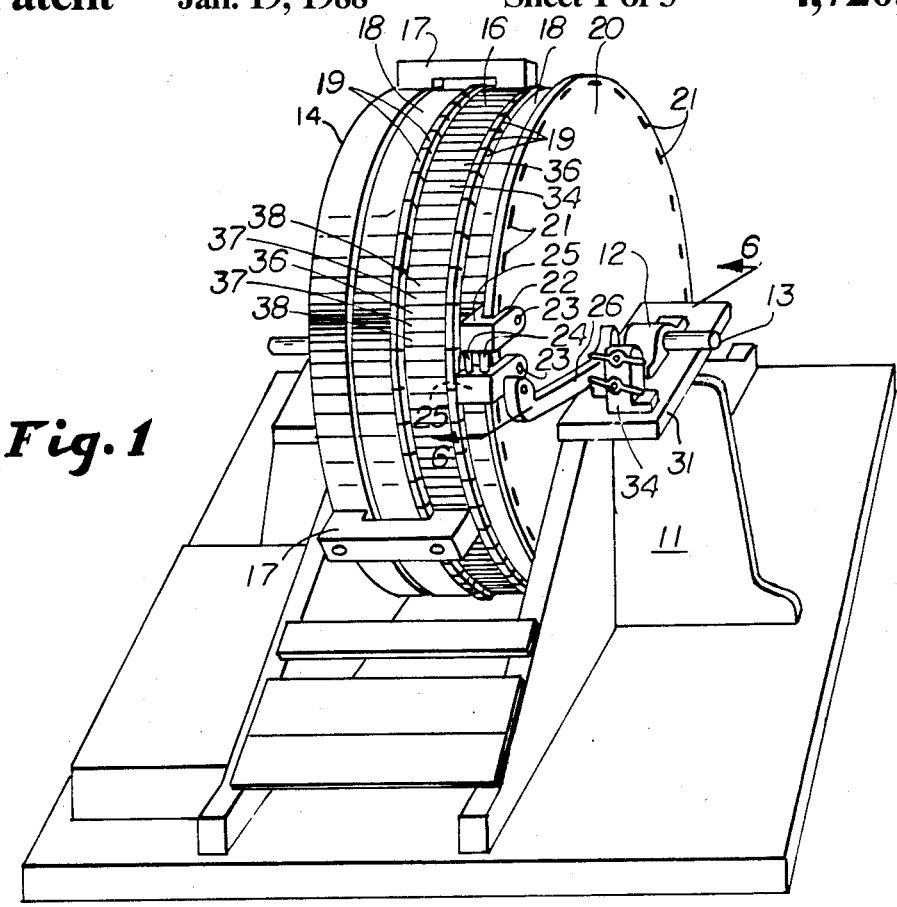
FIG. 1 is a perspective view showing the motor of the present invention.

FIG. 1 shows one form of the invention, it being understood that the physical characteristics thereof are subject to wide modification. For example, the base and shaft support are shown very generally for purposes of understanding the basic principles of the invention.

Figure 6:
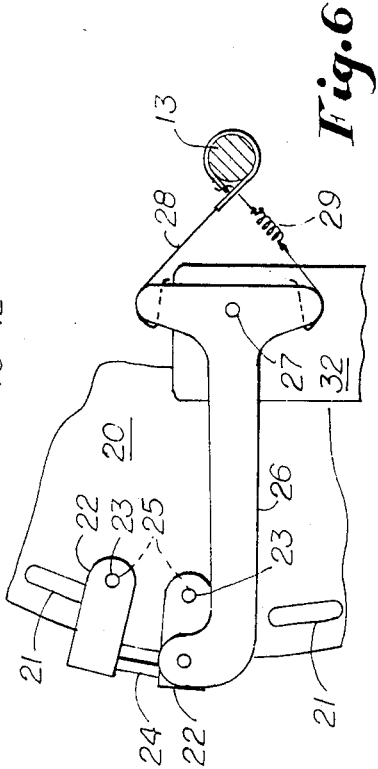
FIG. 6 is a fragmentary sectional view taken substantially along line 6—6 of FIG. 1.

The motor is mounted on a base 11 which supports bearings 12 for rotation of shaft 13 which may be connected to a load (not shown). Stator mounting or hub 14 is fixed relative to base 11 but shaft 13 is rotatable therein. Stator 16 is supported by hub 14 by means of a plurality of connectors 17 fixed to the hub 14 and stator 16. As here shown, there are two rotors 18, one between hub 14 and stator 16 and the other on the opposite side of stator 16. Each rotor has a plurality of magnets 19 fixed thereto, the polarity of the magnets alternating N to S and having like poles facing. In a preferred embodiment there are 64 such magnets, which may be of the ceramic type. The rotors 18 are fixed for rotation with shaft 13. Fixed to one of the rotors 18 is a timing flange 20 having a plurality of arcuate windows 21 near its periphery. Shutter mountings 22, which are approximately U-shaped, straddle the flange 20. One side of each mounting 22 contains a photoemitter and the other side a photodetector. Thus, the emitter beam passes through windows 21 at one point in the rotation of the motor and, at other points in the rotation thereof, the beam is interrupted. There are two shutter mountings 22 shown and these are interconnected by connectors 24 so that they are a fixed distance apart. The mountings 22 are supported by a radial arm 26 pivotted by pivot 27 (See FIG. 6) to radial arm mount 32 supported by base 11 and carrying on its opposite side a friction band 28 around the shaft 13 which is held taut by spring 29. Thus, as the rotational direction of shaft 13 changes, the timing shutter mountings are advanced to an optimum position.

To limit pivotal movement of arm 26, stops 31 are mounted on projections 34 fixed relative to base 11 to confine the extent of arcuate movement.

It will be understood that the use of windows 21 is only one timing means. For example, mirrors (not shown) could be mounted on outer rotor 18 and the LEDs 23 and detectors 25 located on the same side of rotor 18.

Figure 2:
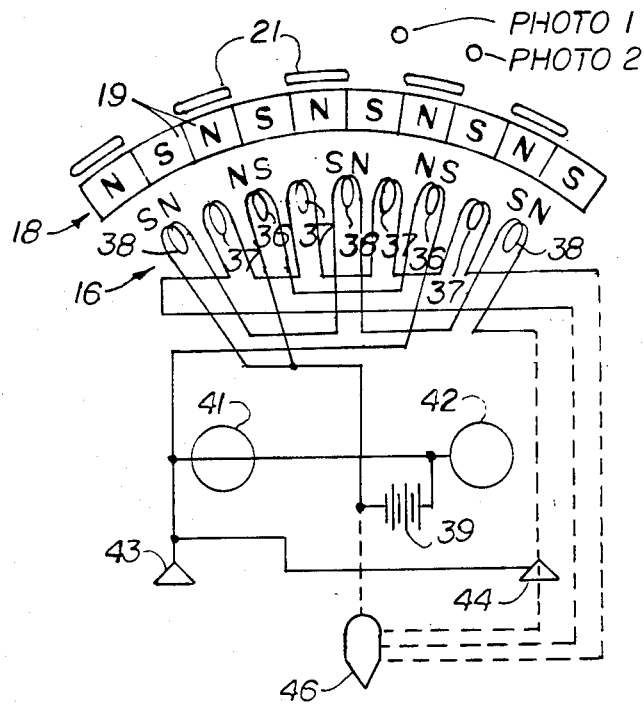

Directing attention now to FIG. 2, for clarity of understanding, only a sector of the rotor 18 is shown and this is transposed outside the sector of the stator 16. It will be understood that, in actual practice as shown in FIG. 1, the stator and rotor are parallel to each other. Rotor 18 has a series of ceramic magnets 19 disposed around its periphery alternating N and S. As the rotor 18 turns, the magnets pass through the fields of the coils in the stator 16 or induce current flow through said coils. Within the rotor 18 is shown a sector of the stator 16. It will be noted that the coil 36 has a coil 37 on either side thereof. Next to the alternator coils 37 on either far side are coils 38 which are wound oppositely to the coils 36.

Figure 3:
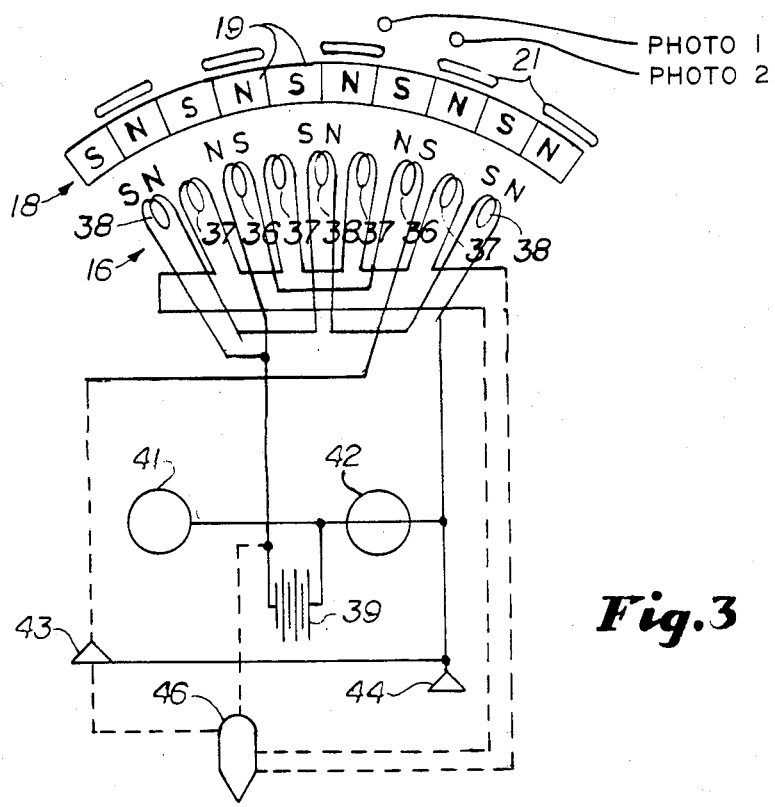
FIGS. 2 and 3 are schematic view of portions of the rotor and the stator and the electric circuitry connected to the stator, FIGS. 2 and 3 showing the motor in different positions of its cycle of operation.

In the preferred embodiment, there are eight coils 36 and eight coils 38 and there are sixteen coils 37 in the preferred embodiment shown in FIG. 1. It will be understood that the number of coils is subject to modification. All of the coils 36 are wired in series and all of the coils 37 are wired in series as are all of the coils 38. Coils 36 and 38 are oppositely wound. Further directing attention to FIG. 2, it will be seen that there are two power switches 41, 42 connected to the battery 39 or other source of direct current. The power transistor switches 41 and 42 are alternately opened and closed by the photocells 25 as the motor turns. Comparison of the positions of the switches in FIGS. 2 and 3 with the position of the windows 21 shows how the coils 36 first is a motor driving coil in that it is connected into the battery 39 and then is disconnected therefrom. The fields of magnet coils 36 attract and repel the permanent magnets 19, causing the rotor 18 to turn. Likewise coils 38, alternately with coils 36.

When coil 36 or 38 is not connected to the battery 39, it is connected through triac (thyristor) switch 43 or 44 and 47 or 48 to the rectifier 46 and functions to partially charge the battery 39. At all times, the alternator coils 37 are connected through the rectifier 46 partially to charge the battery 39.

Figure 4:
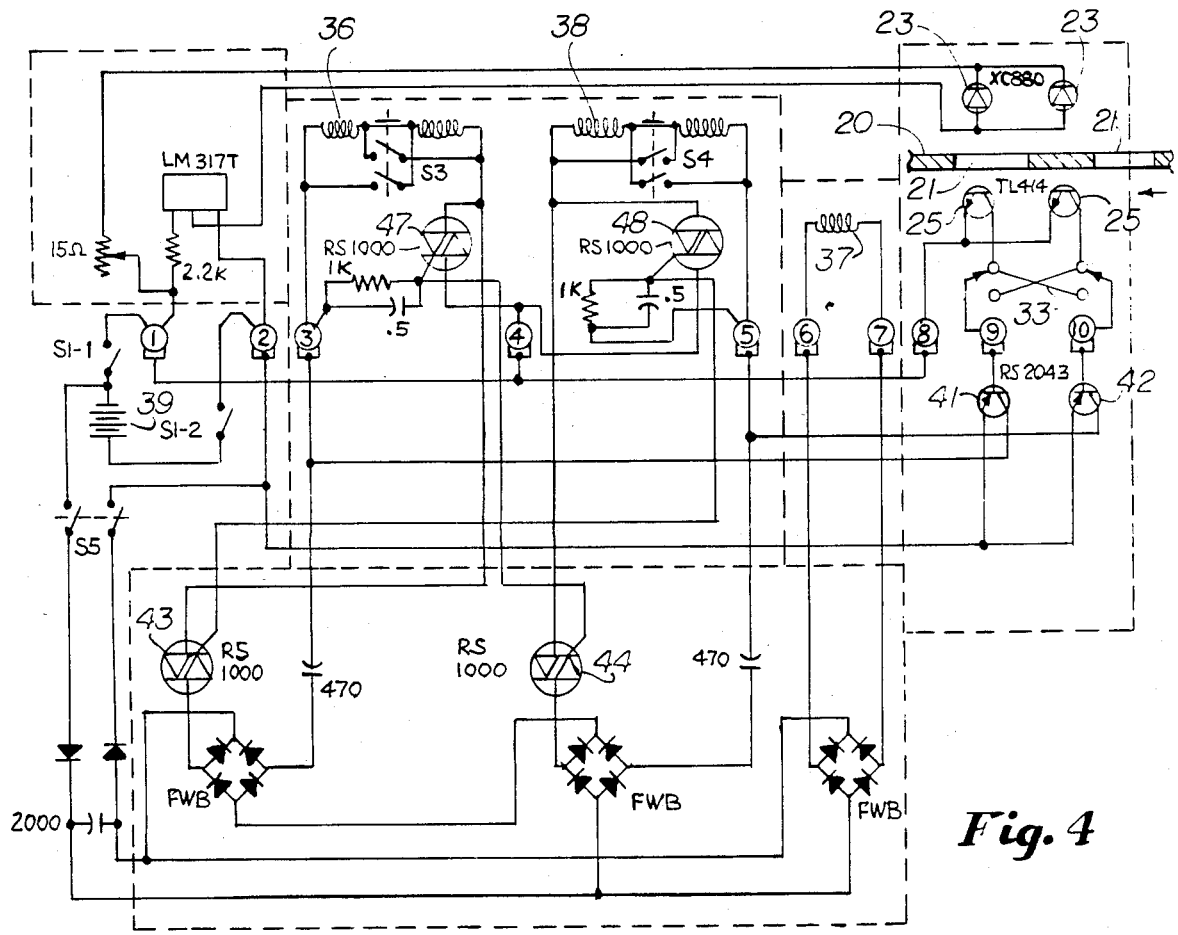
FIG. 4 is a schematic diagram of the electrical system.
Figure 5:
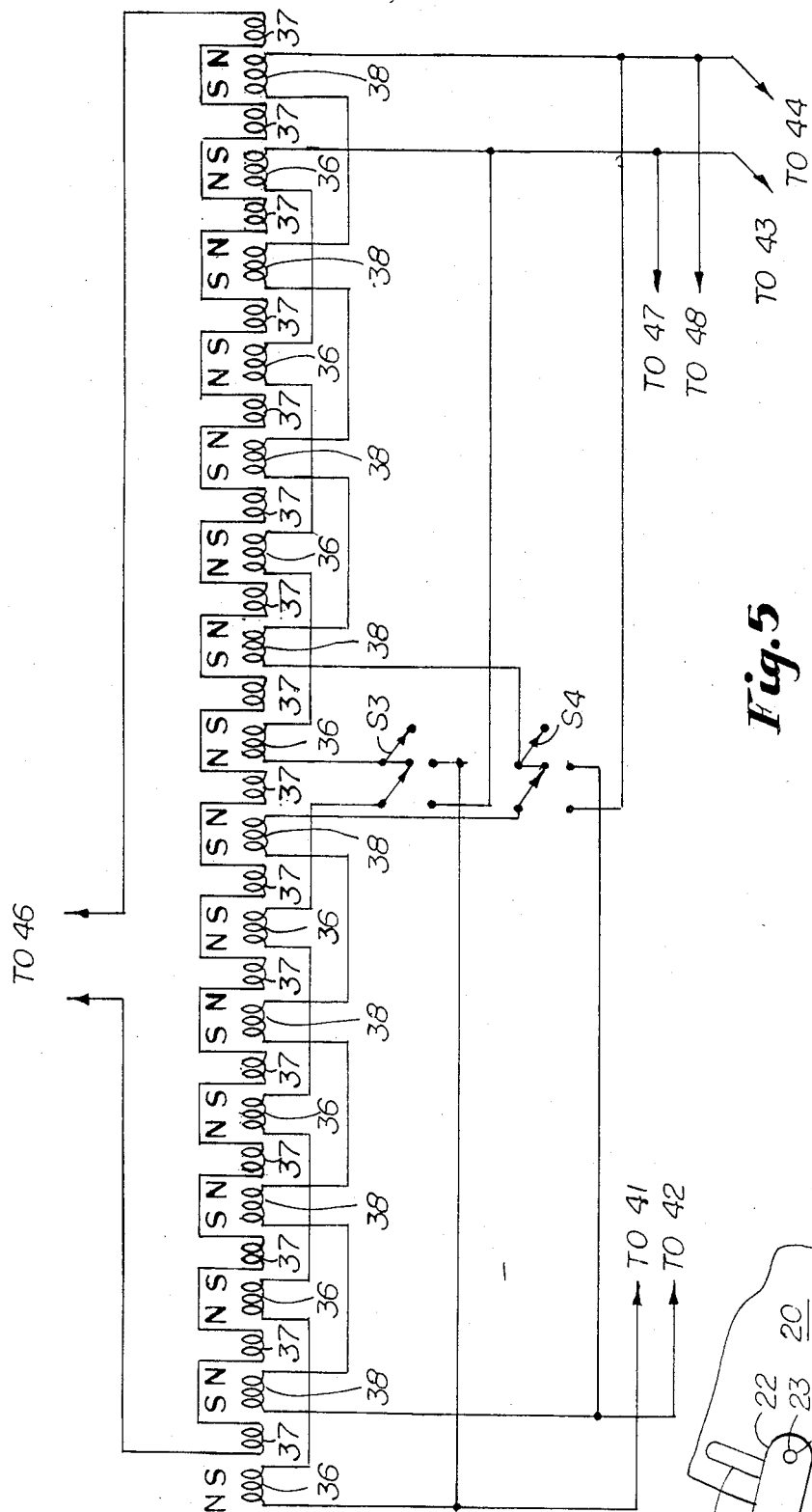
FIG. 5 is a partially schematic diagram showing the arrangement of the coils of the stator developed in a straight line.

FIG. 4 shows schematically how the coils 37 are connected in series, as well as the coils 36 being connected in series and the coils 38 likewise being connected in series. The terminals indicated in FIG. 5 correspond to the terminal marking on the schematic FIG. 4.

Further in connection with FIG. 4 a reversing switch 33 (which also may function as a brake) is shown, operable to reverse the signals from detectors 25.

What is claimed is:

1. A motor comprising
   a stator having a plurality of first coils wired in series, a plurality of second coils wired in series and a plurality of third coils wired in series, said second coils being positioned between said first and third coils, said coils being fixed around the periphery of said stator, said first and third coils being wound in opposite directions,
   a rotor having a plurality of permanent magnets having alternating N and S poles positioned to sweep past said coils of said stator as said rotor turns,
   a shaft fixed to said rotor and rotatable relative to said stator,
   a source of dc current, switching means arranged to energize said first coils and said third coils alternately from said source,
   a rectifier to supply dc current to said source from said second coils and also alternately from said first and third coils when the latter are not energized from said source,
   said second coils being connected to said rectifier to supply dc current to said source at all times when said motor is operating,
   and timing means rotatable with said rotor to control said switching means.

2. A motor according to claim 1 in which said timing means comprises a photodetector to control said switching means, a disc rotatable with said rotor, and photodetector actuator means carried by said disc to control light reaching said photodetector.

3. A motor according to claim 2 in which said photodetector actuator means comprises apertures on said disc, said photodetectors being operable with said apertures to produce timing signals.

4. A motor according to claim 2 which further comprises adjustment means to adjust the position of said photodectors relative to said stator to maximize the speed of said motor.

5. A motor according to claim 1 in which said switching means comprises a first switch between said source and said first coil and a second switch between said source and said third coil, said first and second switches being operable to energize and de-energize said first and third coils alternately from said source.

6. A motor according to claim 5 which further comprises first and second triac switches each connected to said rectifier and both said first and third coils and operable to connect to said rectifier only those coils not energized by said source.

7. A motor according to claim 1 which further comprises means to advance and retard said timing means to control the speed of said motor.

8. A motor according to claim 4 in which said adjustment means comprises lever means supporting said photodetectors, a pivot for said lever means and means responsive to the speed of said shaft for causing said lever means to pivot about said pivot.

* * * * *